United States Patent

[11] 3,617,780

[72] Inventors Albert Benjaminson
Menlo Park;
Donald L. Hammond, Los Altos Hills, both of Calif.

[21] Appl. No. 678,306
[22] Filed Oct. 26, 1967
[45] Patented Nov. 2, 1971
[73] Assignee Hewlett-Packard Company
Palo Alto, Calif.

[54] PIEZOELECTRIC TRANSDUCER AND METHOD FOR MOUNTING SAME
6 Claims, 3 Drawing Figs.

[52] U.S. Cl. .......... 310/8.2, 310/8.9, 310/9.4, 310/9.5, 310/9.6
[51] Int. Cl. .......... H01v 7/00
[50] Field of Search .......... 310/9.2, 9.4, 9.1, 9.5, 9.6, 8.9, 8.0, 8.2, 8.3, 9.0; 340/10, 8 PC, 8 S

[56] References Cited

UNITED STATES PATENTS

| | | | |
|---|---|---|---|
| 2,161,980 | 6/1939 | Runge et al. | 310/9.6 X |
| 2,486,916 | 12/1947 | Bottom | 310/9.6 |
| 2,706,326 | 4/1955 | Mason | 310/9.6 X |
| 2,829,284 | 11/1953 | Gerber | 310/9.2 X |
| 3,339,091 | 8/1967 | Hammond | 310/9.2 X |
| 3,396,287 | 7/1968 | Horton | 310/8.1 X |

*Primary Examiner*—D. F. Duggan
*Assistant Examiner*—Mark O. Budd
*Attorney*—A. C. Smith

ABSTRACT: Piezoelectric transducer apparatus which includes a resonator section peripherally supported by a hollow cylindrical housing section formed as an integral part of the resonator section. Electrodes are disposed about the resonator section to produce a vibration-exciting electric field in response to a signal appearing on the electrodes.

PATENTED NOV 2 1971

3,617,780

INVENTORS
ALBERT BENJAMINSON
DONALD L. HAMMOND

BY A. C. Smith

ATTORNEY

PIEZOELECTRIC TRANSDUCER AND METHOD FOR MOUNTING SAME

BACKGROUND AND SUMMARY OF THE INVENTION

The pressure transducer of the present invention determines changes in pressure using the stress modulation of the frequency of a crystal resonator as a basic method of measurement. With thickness resonators, a lateral stress (i.e., a force lying in the plane of the resonator) can be applied to the plate at the edges to produce perturbations in the density $\rho$, the thickness $t$, and the elastic constant $c$. These perturbations cause frequency changes through the approximate expression for frequency, $$f=\frac{1}{2t}\sqrt{\frac{c}{\delta}}.$$

The force-induced frequency changes are much too large and anisotropic to be explained by the change in the frequency-controlling dimension $t$ due to Poisson ratio or by the change in density $\rho$. The dominant influence is therefore believed to be the elastic constant $c$. It is therefore very important that the stress be applied to the resonator in a manner which is free from any materials exhibiting plastic flow in order to avoid hysteresis effects and to provide a linear relationship between frequency and pressure.

In addition to the requirement of eliminating plasticity in the resonator mounting apparatus, it is also necessary that the resonator mount avoid introducing residual stresses which may decay with time to alter the linearity of the relationship between frequency and pressure. Finally, the temperature coefficient of the resonator frequency and temperature coefficient of the relationship between pressure and resonator frequency (i.e., the scale factor) must be controlled so resonator frequency will not vary substantially for a given applied pressure if the temperature of the resonator changes.

In accordance with the preferred embodiment, a pressure transducer is provided in which plastic deformation, frequency vs. temperature variations, and residual stresses are substantially removed from the resonator section. The thickness shear resonator section is a BT- or AT-cut convex piezoelectric crystal plate supported by an integral cylinder of quartz crystal material. The resonator plate is inside of the hollow cylinder and forms an integral supporting web of the cylindrical housing and is therefore sensitive to pressure changes on the outside of the cylindrical housing section.

Through additional processing, flanged ends of the cylindrical housing are brazed to flat quartz crystalline plates to provide a clean, evacuated sealed chamber over the major surfaces of the resonator. Thus, in its final form the resonator is protected from contamination to assure maximum stability and to avoid damping effects. Alternately, hemispherical end pieces can be attached to the ends of the cylindrical housing so little bending stress will be introduced in the housing by normal pressure at the cylindrical housing ends.

In another embodiment of the invention useful as a precision resonator for frequency control applications, the structure may be simplified by locating the resonator section at an end of its integral cylindrical housing section and by mounting the structure on an enlarged flange at the other end of the cylindrical housing. This structure provides the advantage of a secularly stable mount which does not introduce residual mounting stresses into the resonator section.

DESCRIPTION OF THE PREFERRED EMBODIMENT

Figure 1:
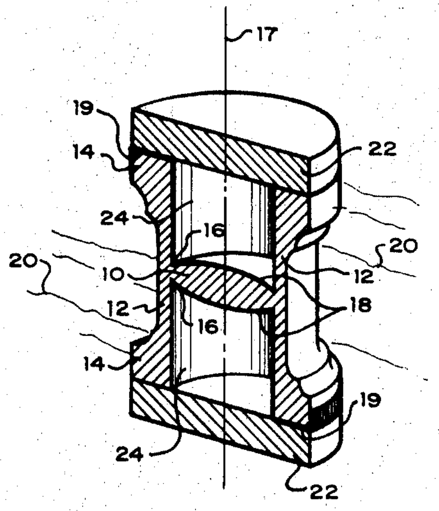
FIG. 1 is a cross-sectional perspective view of the preferred embodiment of the invention.

Referring now to FIG. 1 there is shown a one piece piezoelectric crystal resonator and housing structure and its major sections, resonator 10, cylindrical housing 12, and flanged ends 14. Resonator section 10 is convex-shaped and forms an integral part of the assembly at its periphery 16. Resonator section 10 and integral housing section 12 are of BT-cut quartz crystal oriented with respect to axis 17 which is an axis of symmetry of resonator section 10. Such a BT-cut resonator exhibits both a zero temperature coefficient of frequency under zero pressure and a near zero temperature coefficient of the pressure coefficient of frequency. Therefore little variation in frequency response will be introduced by temperature changes. Electrodes 18 are formed on both sides of the resonator section by conventional techniques such as thin film metallic plating. A portion of electrodes 18 continues along the inside of cylindrical section 12 to facilitate electrical contact at points 19 along the outside of cylindrical housing section 12. With the application of an applied electric field by signal excitation of the resonator section through electrodes 18, fundamental thickness shear mode convex resonator section 10 vibrates substantially at its central region leaving a relatively inactive periphery 16.

A hollow cylindrical section of the same crystal unit forms housing section 12 of resonator 10 by continually surrounding resonator 10 at its periphery 16 midway between the ends of housing cylinder 12. The cylindrical wall serves as a diaphragm through which the mechanical stress can be applied to the resonator and through which mechanical damping of a surrounding fluid 20 can be effectively coupled to the diameter of the resonator, thus effectively damping all contour modes of motion. The integral cylinder wall must be thin enough to prevent propagation of acoustic waves at the resonator frequency and to allow pressure changes on its outside surface to transfer radial compressional forces to the resonator section. This method of damping the contour modes of motion reduces their effects upon the desired frequency response to thickness shear and improves the frequency-temperature characteristics as well as the short term frequency stability.

The integral cylindrical housing 12 is terminated on both ends by enlarged flanges 14 also of integral structure of piezoelectric crystal. Through additional processing, these flanges 14 are brazed to flat crystalline plates 22 to provide a clean, evacuated sealed chamber 24 over the major surfaces of the resonator. These end plates are oriented piezoelectric crystal plates to match the anisotropic thermal expansion of cylindrical housing section 12. The plates 22 protect the resonator section from contamination to assure maximum stability and to avoid damping. This completely sealed resonator may then be immersed in surrounding fluid 20 which will provide effective and repeatable damping to the propagation of acoustic energy along the cylindrical walls in addition to providing a means of transferring and applying hydrostatic pressure to the transducer.

Figure 2:
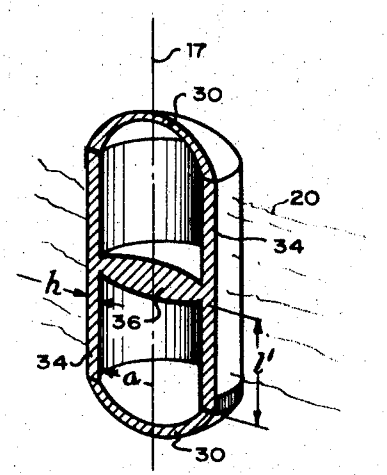
FIG. 2 is a cross-sectional perspective view of another embodiment of the invention.

FIG. 2 illustrates another embodiment of the invention with hemispherical shell end pieces 30 bonded to cylindrical housing section 34. The radius of curvature of surfaces 30 is selected in order that minimal bending stresses will be introduced in the sides of cylindrical housing section 34 by hydrostatic pressure on surfaces 30 from surrounding fluid 20, as such bending stresses would adversely affect the frequency response of integral resonator section 36. Resonator section 36 and integral housing section 34 are of AT-cut quartz crystal oriented with respect to axis 17 which is an axis of symmetry of resonator section 36. Such an AT-cut resonator exhibits a zero temperature coefficient of frequency under zero pressure, so this effect of temperature changes will be avoided.

Figure 3:
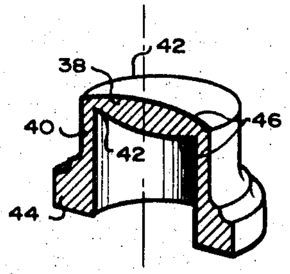
FIG. 3 is a cross-sectional perspective view of another embodiment of the invention primarily for use as a precision resonator.

Another embodiment of the present invention; shown in FIG. 3, represents a precision resonator for frequency control applications. Resonator section 38 is a convex-shaped piezoelectric crystal forming an integral part of cylindrical housing section 50 at periphery 42. The cylindrical section 40 terminates at its other end in enlarged flange 44 which is used for mounting the assembly. Electrodes 46 are disposed on both sides of resonator section 38 for application of an electric current to produce an electric field on resonator section 38, thereby vibrating the resonator section.

We claim:

1. Signal frequency apparatus comprising:
a unitary piezoelectric crystal resonator and housing structure including
a resonator section having opposite surfaces of selected contour spaced about a median plane and including
a cylindrical housing section homogeneously integral with the resonator section about the periphery thereof and extending from said periphery in a direction substantially normal to the median plane to an interface surface which is spaced away from the contour of the adjacent surface of said resonator section;
an end piece shaped substantially as a hemispherical shell attached to said structure at said interface surface for forming a sealed chamber with said housing section; and
electrode two means disposed about the resonator section for providing vibration-exciting electric field in said resonator section in response to applied signal.

2. Signal frequency apparatus as in claim 1 wherein said cylindrical housing section extends from the periphery of said resonator section in opposite directions substantially normal to the median plane of said resonator section to interface surfaces disposed substantially equidistant from the resonator section, and an end piece shaped substantially as a hemispherical shell is attached to said housing section at each of said interface surfaces to form two sealed chambers on opposite sides of said resonator section which have substantially the same pressure.

3. Signal frequency apparatus comprising:
a unitary piezoelectric crystal resonator and housing structure including
a resonator section having opposite surfaces of selected contour spaced about a median plane and including
a cylindrical housing section homogeneously integral with the resonator section about the periphery thereof and having a cylindrical wall thickness $h$ and an inner radius $a$ which is greater than $h$, said cylindrical housing section extending from said periphery in a direction substantially normal to said median plane to an interface surface which is spaced away from the contour of the adjacent surface of the resonator section by a distance $l$ which is greater than $a$;
means attached to said structure at said interface surface for supporting said structure; and
electrode means disposed about the resonator section for providing vibration-exciting electric field in said resonator section in response to applied signal.

4. Signal frequency apparatus as in claim 3 wherein:
said cylindrical housing section has a cylindrical wall thickness $h$ and an inner radius $a$ which is greater than $h$ and extends from the periphery of said resonator section in opposite directions substantially normal to the median plane of said resonator section to interface surfaces, each of which is spaced away from the contour of the adjacent surface of the resonator section by a distance $l$ which is greater than $a$.

5. Signal frequency apparatus as in claim 3 wherein said piezoelectric crystal resonator section is BT-cut quartz.

6. Signal frequency apparatus as in claim 3 wherein said piezoeletric crystal resonator section is AT-cut quartz.

* * * * *